US007002938B2

(12) United States Patent
Hester et al.

(10) Patent No.: US 7,002,938 B2
(45) Date of Patent: Feb. 21, 2006

(54) PICONET SPANNING TREE NETWORK

(75) Inventors: Lance E. Hester, Sunrise, FL (US); Yan Huang, Weston, FL (US); Padmaja Ramadas, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/744,032

(22) Filed: Dec. 23, 2003

(65) Prior Publication Data

US 2005/0135275 A1   Jun. 23, 2005

(51) Int. Cl.
 *H04Q 7/00*   (2006.01)
(52) U.S. Cl. .................. 370/330; 370/338; 370/401; 370/475; 455/41.2
(58) Field of Classification Search ............... 370/255, 370/256, 254, 338, 401, 329, 330, 475, 313, 370/41.2
See application file for complete search history.

(56) References Cited

U.S. PATENT DOCUMENTS

| | | | | |
|---|---|---|---|---|
| 6,876,643 | B1 * | 4/2005 | Aggarwal et al. ........... | 370/338 |
| 2002/0159401 | A1 * | 10/2002 | Boger ......................... | 370/294 |
| 2003/0076842 | A1 * | 4/2003 | Johansson et al. .......... | 370/401 |
| 2005/0058084 | A1 * | 3/2005 | Hester et al. ............... | 370/254 |

OTHER PUBLICATIONS

IEEE Standards 802.15.3, Part 15.3: Wireless Medium Access Control and Physical Layer Specifications for High Rate Wireless Personal Area Networks, Sep. 29, 2003, pp. 8,9,101,103,105,108,151,158-160,164.*

Yan Huang, Matt Perkins, Hian Huang, Lance Hester, Neiyer Correal, Padma Ramadas; "Performance Study of AODV on IEEE 802.15.3 MAC for Wireless Sensor Networks"; Florida Communication Research Labs, Motorola Labs Plantation, FL 33322.

Gergely V. Zaruba, Stefano Basagni, Imrich Chlamtac; "Bluetrees—Scattemet Formation to Enable Bluetooth-Based Ad Hoc Networks" 2001 IEEE.

Theodoros Salonidis, Pravin Bhagwat, Leandros Tassiulas, Richard Lamaire; Distributed Topology Construction of Bluetooth Personal Area Networks.

Godfrey Tan, Allen Miu, John Guttag, Hari Balakrishnan; Forming Scattermets from Bluetooth Personal Area Networks; MIT-LCS-TR-826, Oct. 2001.

(Continued)

*Primary Examiner*—Ricky Ngo
*Assistant Examiner*—Nguyen H. Ngo
(74) *Attorney, Agent, or Firm*—Matthew C. Loppnow (57) ABSTRACT

An apparatus and method for a spanning tree network. A communication device can connect to a piconet network and the communication device can transmit at least one available piconet identifier prior to receiving a request for the available piconet identifier from a dependent communication device, the available piconet identifier providing a parent piconet coordinator identification for the dependent communication device. A dependent communication device can connect to the piconet network, determine if the communication device can support a dependent piconet, and receive at least one available piconet identifier prior to requesting information regarding establishing a dependent piconet, the available piconet identifier providing parent piconet identification for the communication device for the dependent piconet.

22 Claims, 4 Drawing Sheets

OTHER PUBLICATIONS

Zhifang Wang, Robert J. Thomas, Zygmunt Haas; Bluenet—a New Scatternet Formation Scheme; Proceedings of the 35th Annual Hawaii International Conference on System Sciences (HICSS-35'02) 2002 IEEE.

LAN/MAN Standards Committee of the IEEE Computer Society; Draft Standard for Telecommunications and Information Exchange Between System—LAN/MAN Specific Requirements—Part 15: Wireless Medium Access Control (MAC) and Physical Layer (PHY) Specifications for High Rate Wireless Personal Area Networks (WPAN); Oct. 2002.

IEEE Computer Society LAN/MAN Standards Committee; IEEE Standards; 802.15.1™; IEEE Standard for Information technology—Telecommunications and information exchange between systems—Local and metropolitan area networks—Specific requirements; Part 15.1: Wirless Medium Access Control (MAC) and Physical (PHY) Specifications for Wireless Personal Area Networks (WPANs); Jun. 14, 2002.

* cited by examiner

PICONET SPANNING TREE NETWORK

BACKGROUND

1. Field

The present disclosure is directed to a method and apparatus for a spanning tree network. More particularly, the present disclosure is directed to creation and operation of multiple overlapping piconets using piconet identifiers.

2. Description of Related Art

Presently, individual devices can be used to create an ad hoc wireless piconet. Upon creation of the piconet, the devices can send messages to each other through the piconet. Unfortunately, these devices usually have a limited transmission range. This can be problematic when the complete network extends over a physical area much larger than this range. In order for the network to scale to a large order, it must chain together a series of piconets. Likewise, in order to communicate to devices beyond its range, a piconet device must relay its message via intermediate devices. Such multi-hop communication is problematic because intervening devices, especially those located in different piconets, may not be synchronized in order to receive each other's transmissions.

Thus, there is a need for an improved method and apparatus for creation and operation of a spanning tree network including a piconet.

BRIEF DESCRIPTION OF THE DRAWINGS

The embodiments of the present invention will be described with reference to the following figures, wherein like numerals designate like elements, and wherein.

DETAILED DESCRIPTION

The disclosure provides an apparatus and method of creation and operation of a piconet using piconet identifiers. According to one embodiment, the present disclosure provides a method in a communication device of communicating between other devices in a piconet network. The method can include connecting to the piconet network and transmitting at least one available piconet identifier prior to receiving a request for the available piconet identifier, the available piconet identifier providing parent piconet coordinator identification, such as a piconet identifier and/or a parent identifier. The available piconet identifier can be transmitted in a beacon of a superframe. The method can also include receiving a request to become a dependent piconet coordinator capable of establishing a dependent piconet, the request including the available piconet identifier. The piconet network can be a collection of a plurality of logically associated devices that share a single piconet identifier with a common coordinator and individual device identifiers (DEVIDs). The at least one available piconet identifier can include The method can also include transmitting information for creation of a block of available piconet identifiers, the size of the block of available piconet identifiers being based on a maximum number of desired piconet coordinators. The size of the block of available piconet identifiers can also be based on a maximum number of desired piconet coordinators and a maximum number of levels of dependent piconet coordinator communication devices.

According to another embodiment, the present disclosure provides a communication device for communicating between other devices in a piconet network. The communication device can include a transceiver configured to connect to the piconet network and a controller coupled to the transceiver, the controller configured to transmit, via the transceiver, at least one available piconet identifier prior to receiving a request for the available piconet identifier, the available piconet identifier providing a parent piconet coordinator identification for one of its dependent coordinator communication device. The available piconet identifier can be transmitted in a beacon of a superframe. The controller can be further configured to receive, via the transceiver, a request to become a dependent piconet coordinator capable of establishing a dependent piconet, the request including the available piconet identifier. The piconet network can include a collection of a plurality of logically associated devices that share a single piconet identifier with a common coordinator and individual device identifiers. The at least one available piconet identifier can include The controller can also be configured to transmit, via the transceiver, information for the creation of a block of available piconet identifiers, the size of the block of available piconet identifiers being based on a maximum number of desired piconet coordinators. The size of the block of available piconet identifiers can also be based on a maximum number of desired piconet coordinators and a maximum number of levels of dependent piconet coordinator communication devices.

According to another embodiment, the present disclosure provides a method in a communication device of communicating between other devices in a piconet network. The method can include connecting to the piconet network, determining if the communication device can support a dependent piconet, and receiving at least one available piconet identifier prior to transmitting information regarding requesting establishing a dependent piconet, the available piconet identifier providing parent piconet identification for the communication device for the dependent piconet. The information regarding requesting the establishment of a dependent piconet can include an indicator indicating a desire to become a dependent piconet coordinator capable of establishing a dependent piconet. The available piconet identifier can be received in a beacon of a superframe. The method can also include transmitting a request to become a dependent piconet coordinator capable of establishing a dependent piconet and the request including the available piconet identifier. The piconet network can include a collection of a plurality of logically associated devices that share a single piconet identifier with a common coordinator. The method can further include calculating a block of available piconet identifiers, the size of the block of available piconet identifiers being based on a maximum number of desired piconet coordinators. The size of the block of available piconet identifiers can also be based on a maximum number of desired piconet coordinators and a maximum number of levels of dependent communication devices.

According to another embodiment, the present disclosure provides a communication device for communicating between other devices in a piconet network. The communication device can include a transceiver configured to connect to the piconet network and a controller configured to determine if the communication device can support a dependent piconet, the controller further configured to receive, via the transceiver, at least one available piconet identifier prior to transmitting information regarding requesting establishing a dependent piconet, the available piconet identifier providing parent piconet identification for the communication device for the dependent piconet. The information regarding requesting establishing a dependent piconet can include an indicator indicating a desire to become a dependent piconet coordinator capable of establishing a dependent piconet. The available piconet identifier can be received in a beacon of a superframe. The controller can be further configured to transmit, via the transceiver, a request to become a dependent piconet coordinator capable of establishing a dependent piconet, the request including the available piconet identifier. The piconet network can be a collection of a plurality of logically associated devices that share a single piconet identifier with a common coordinator and individual device identifiers. The controller can further be configured to calculate a block of available piconet identifiers, the size of the block of available piconet identifiers being based on a maximum number of desired piconet coordinators. The size of the block of available piconet identifiers can be based on a maximum number of desired piconet coordinators and a maximum number of levels of dependent piconet coordinator communication devices.

Figure 1:
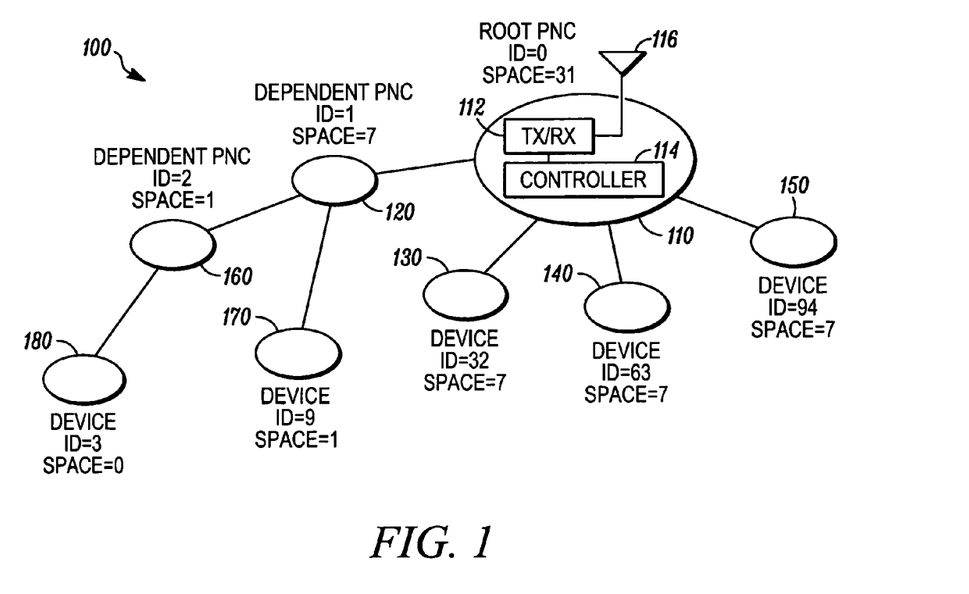
FIG. 1 is an exemplary block diagram of a system, such as a tree, including at least one piconet according to one embodiment.

FIG. 1 is an exemplary block diagram of a system 100, such as a tree, including at least one piconet according to a related embodiment. The system 100 can include devices such as a Root piconet coordinator (Root PNC), dependent PNCs such as parent PNCs 120 and 160, and other devices 130, 140, 150, 170 and 180. The other devices 130, 140, 150, 170 and 180 may also be PNCs depending on considerations described below. Each device, such as device 110, can include a transceiver 112 coupled to an antenna 116 and a controller 114 coupled to the transceiver 112. Each of the devices may be a communication device, a cordless telephone base station, a wireless/cordless telephone, a cellular telephone, a personal digital assistant, a pager, a personal computer, a mobile communication device, or any other device that is capable of sending and receiving communication signals.

The system 100 creates a logical spanning tree routing backbone from an underlying set of overlapping piconets. For example, the spanning tree can promote intra- and inter-piconet communication in IEEE 802.15.3 piconets, but is not solely limited to 15.3 piconets. As another example, the system 100 can avoid routing loops and ensure at least one unique path can exist between any two devices. As a further example, routing paths can traverse the tree in upward and downward directions, so that the average device-to-device latency can be relatively small. These and other benefits are provided by the present disclosure.

The devices may act as a Root PNC, such as the device 110, a dependent PNC, such as devices 120 and 160, or simply a non-PNC piconet device, such as the devices 130, 140, 150, 170, and 180. All the devices can be mobile or fixed devices. Typically, there is only one Root in the tree. Every dependent PNC, such as the device 160, is the child of another dependent PNC, such as the device 120, or the Root, such as the device 110. Regular piconet devices can represent leaves of a tree in that they are merely members of the piconet system 100 and more specifically non-PNC devices located in the one independent piconet (120, 140, and 150) or non-PNC devices located in a dependent piconet (170). These nodes are plainly referred to as child devices in a tree. Typically, a device may only be active in one piconet at a time. Therefore, a dependent PNC operating in its parent's piconet will appear like any other non-PNC device in that piconet.

For tree formation the first device to begin the formation of the logical spanning tree network is the Root device 110. It is at a logical Level-0 in the tree 100. Here, level or depth can refer to the logical distance that a device in the tree 100 is from the Root device 110. The next set of devices form the tree. For example, the Level-1 devices can be devices within the transmission range of the Root device 110. The Level-2 devices can be devices within the range of the Level-1 devices, but in most cases outside the range of the Root device 110. For example, Level-m devices can be devices within the range of the Level-(m-1) devices, but possibly outside the range of the Root device 110, the Level-1 devices, the Level-2 devices, and the Level-(m-2) devices. The system 100 can have physical realizable constraints on the number of children and depth allowed for each device. Thus, it is possible that some devices at Level-m may be in transmission range of devices at Level-(m-2), but are forced to join the network at Level-m because some device at Level-(m-2) may not support it as a child at Level-(m-1).

All tree devices, except for the Root device 110, can have a single parent in the piconet system 100. A device can have a different parent for every piconet that it is a member. As mentioned, a device may only actively participate in one piconet at a time. A parent device is one level closer to the Root device 110 than its child. The shortest distance in hops between a device and the Root device 110 can be defined as the depth of this device. Namely, a Level-m device has a depth m in the logical backbone hierarchy; that is, it is "m hops" away from the Root device 110.

For spanning tree formation, the devices can be placed in a given area. Some devices, like the Root device 110, can be placed strategically, while others randomly. A network operator can be responsible for positioning the devices within communication range of at least one other pre-existing piconet coordinating device. Once placed, a device can be in an "on" state which means it can operate in receive or transmit modes, where receive mode operation can dominate.

The Root device 110 can start the creation of the physical and logical topologies. It can passively scan the possible number of communication channels to find a free channel upon which to start a piconet. Choosing the first free channel, the Root device 110 can form the first and only independent piconet of the tree system 100. All subsequent devices forming the tree may use this channel.

The Root can set its device identifier (DevID) to a value such as 00000000-hex or 0-decimal, and its piconet identifier (PNID), such as a 16-bit PNID, to 0. Equivalently, these values can equal network address fields: Network Identifier (NID) and Parent Identifier (PID). The piconet coordinator identifier (PNCID) of the PNC can be equivalent to the PNID. In network information tables, the Root device 110 can store its NID, its PID, and can set its depth to 0. Because the Root device 110 is the first device in the logical network, it can have an empty neighbor list.

Figure 2:
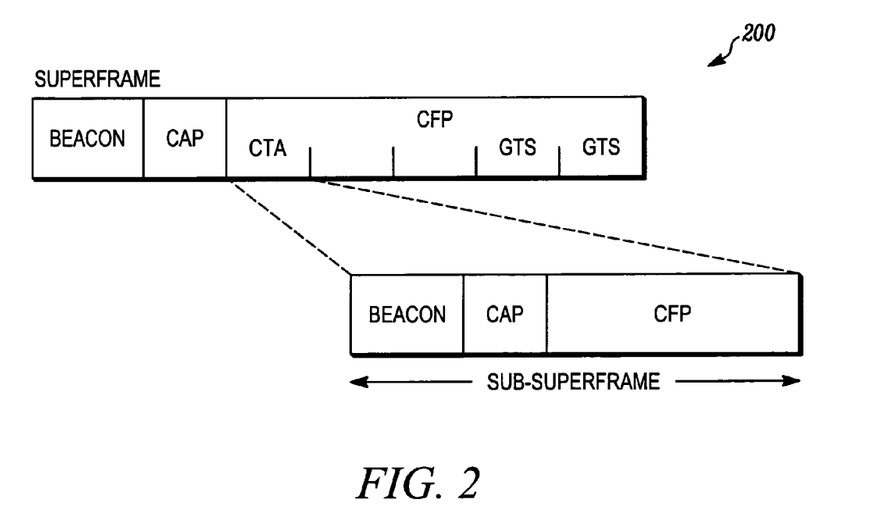
FIG. 2 is an exemplary illustration of a superframe according to one embodiment.

FIG. 2 is an exemplary illustration of a superframe 200 according to one embodiment. The superframe 200 can include a beacon, a contention access period (CAP), and a contention free period (CFP) including at least one channel time allocation (CTA), and guaranteed time slots (GTS). A CTA can include a sub-superframe that can include a beacon, a CAP, and a CFP. In operation, as a PNC, the Root device 110 can broadcast a beacon every superframe 200. The duration of this superframe 200 can be 64 milliseconds. The beacons can provide synchronization information, such as superframe duration, PNID, and other information for unassociated devices to join its piconet. Also, in the beacon, depth information can be broadcast along with available PNIDs/PIDs that can be used for dependent piconets. A PNC can assign itself a GTS in the contention free period, CFP, of its superframe. A PNC may perform some calculations to determine a block of PNIDs, which can be used for its dependent piconets as described below.

An unassociated device does not have a unique network address (NID and PID) or depth value. Its neighborhood list is empty. Once honing onto the channel being used by the Root device 110 or another pre-existing PNC by listening for PNC beacons, it can send a CONNECTION REQUEST packet to a heard PNC. This CONNECTION REQUEST packet can contain the PID and NID of the beaconing PNC. If the PNC is able to support the device in its piconet, it can respond to the unassociated device's association request by sending a CONNECTION RESPONSE indicating that the device has associated to the piconet. The PNC can give the device a DevID, such as an 8-bit DevID, which can also be used as the devices network identifier (NID). The device can store, in its network information tables, its NID, its PID (PNID of its PNC), its parent's depth (depth of its PNC), and its new depth (1+its parent's depth), and it can add the PNC to its list of neighbor devices, marking the PNC as a parent device. Likewise, the PNC can add this device to its neighbor list and can designate it as a child. The PNC can also reserve a pseudo-static channel time allocation (GTS) for this device. The device can then confirm that it has successfully joined the piconet by hearing its new member notification in the information elements of its PNC's beacon. Devices in the piconet can update their information tables accordingly, marking the device as a sibling. To ensure that all piconet devices know all the members of the piconet, the PNC can periodically broadcast the members of its piconet.

As additional devices associate to the network, they can be added to the physical and logical topology in a similar manner, and can each have pseudo-static CTA or GTS set aside for them in that piconet. The construction of the logical backbone architecture can be based on an underlying physical network topology and can happen in a sequential manner.

For PNID assignment, the hierarchical spanning tree structure can assist the network protocol in dispensing unique PNIDs so that the system 100 can avoid PNID assignment redundancies. For example, such avoidances can reduce extra messages that would result from PNID duplication searches and especially duplication resolution such as re-addressing for all devices within a piconet.

The maximum number of possible PNIDs can be set to a constant Max_PNIDs, the maximum number of dependent piconets or PNCs can be set to Max_DPNC, and the maximum number of levels in a tree can be set to Max_L, then the total number of PNID addressable PNCs in a given tree can be determined from:

$$\sum_{k=0}^{Max\_L} Max\_DPNC^k \leq (Max\_PNIDs - 1)$$

The total number of PNIDs used for a given tree network can be significantly smaller than Max_PNIDs because the number of dependent PNIDs, especially for networks that cannot reuse CTAs, will be small. The allocation of PNIDs can be performed in a distributive or centralized manner.

In the centralized scheme, the Root PNC 110 can have a list of all the possible PNIDs for that network. Every parent PNC that can support a dependent PNC can obtain a PNID from the Root PNC 110. The Root PNC 110 can send the parent PNC an available PNID. When a device in the parent's piconet wishes to start a dependent piconet, it can listen to its parent's PNC beacon field to see if a PNID is available. If a parent PNC does not broadcast an available PNID, it may be unable to support dependent PNCs. Thus, the child device will not attempt to start a dependent piconet. On the other hand, if an available PNID exists, then a child device can request to become a dependent PNC from the parent PNC. It can be allocated the available PNID and the parent PNC can request or obtain another PNID from the Root PNC 110 if it can support another dependent PNC.

According to another related embodiment, a more distributed way of allocating PNIDs can be to allocate each PNC a block of possible ids. The spacing between the blocks of ids can be calculated based on:

$$Block\ size = 2 * Max\_PNCs^{Max\_L}$$

and $$space = floor\left[\frac{Block\_Size - \sum_{k=0}^{Li}(Max\_PNCs)^k}{(Max\_PNCs)^{Li+1}}\right]$$

where Max_L can represent the maximum number of levels of the tree, Max_PNCs can represents the largest number of dependent PNCs for any device, and Li can represent a level of the tree.

Accordingly, the Root PNC 110 can be at depth/layer 0 (Li=0), PID=(0×00). Each capable piconet device can listen to beacon information from its parent PNC. The parent PNC can be responsible for informing its child devices of the maximum number of allowable dependent PNCs (Max_PNCs), maximum levels (Max_L) of the tree, and its level or depth via beacon information. A device can hear an available PNID/PID broadcasted in the beacon as well. This PNID informs a child device that the parent PNC can support dependent piconets. The child device can send its parent PNC a BECOME PARENT REQUEST in the CAP of the superframe 200. Sending this type of message in the CAP can provide some level of fairness to multiple piconet devices opting to become dependent PNCs at the same time. Once one BECOME PARENT REQUEST has met with success for a dependent piconet, the parent PNC can broadcast a new dependent PID address, if possible, and other piconet devices, especially those that were unsuccessful, may try to capture this id and become dependent piconets.

From the PNID, a dependent PNC can calculate the block of addresses that it may dispense to its dependent PNCs. It can calculate this information using its level in the tree, the values of Max_L and Max_PNCs, and its PNID as the initial starting address. As an example, the equations below can be used to determine the PNIDs and the space between addresses for the system 100.

Max_L=3 and Max_PNCs=4.

Block size=2*4³=128

$$space = floor\left[\frac{Block\_Size - \sum_{k=0}^{Li}(Max\_PNCs)^k}{(Max\_PNCs)^{Li+1}}\right]$$

$$space = floor\left[\frac{128 - \sum_{k=0}^{Li}(4)^k}{(4)^{Li+1}}\right]$$

For dependent piconet generation, devices in one piconet may start a dependent PNC, thereby expanding network coverage. The dependent piconet can extend outward from the tree 100 like a new branch with leaf devices attached. A device may choose to become a dependent PNC based on applications specific to the device, available resources, or other considerations.

Before becoming a dependent PNC, a device can listen to its parent PNC's beacon to determine if a PNID/PID is available. If it hears a PNID, it knows its parent is able to support a dependent piconet. The device can then transmit a BECOME PARENT REQUEST to the parent PNC requesting to allocate a block of time slots and a pseudo-static private CTA, as shown in the superframe 200. The CTA can constitute a smaller replica of the parent PNC's superframe. By allocating these private blocks of time, such as multiple slots, the system 100 can be able to avoid interference between devices because device transmissions can take place in a time division multiple access (TDMA) approach. The device can use the PNID revealed by its parent PNC for its PNCID. By having the Parent PNCs assign PNIDs, it can be ensured that this device's PNID is different not only from its parents PNCID, but also any other neighboring PNCs. Once the Parent PNC assigns the broadcast PNID, it can broadcast the next available PNID from its list of calculated PNIDs/PIDs if it is able to support another dependent PNC.

Like its parent, the dependent PNC device can broadcast beacons pursuant to its superframe duration and it can calculate a block of addresses using its maximum depth, children, and CTA. The dependent PNC device can continue to use its depth value as obtained from its parent's piconet so that it can always know from a global network perspective its logical distance in hops away from the Root PNC 110. Unassociated devices in the vicinity of the dependent PNC can attempt to associate to it. Likewise, devices associated to existing piconets, may also attempt to join this new dependent piconet.

Figure 3:
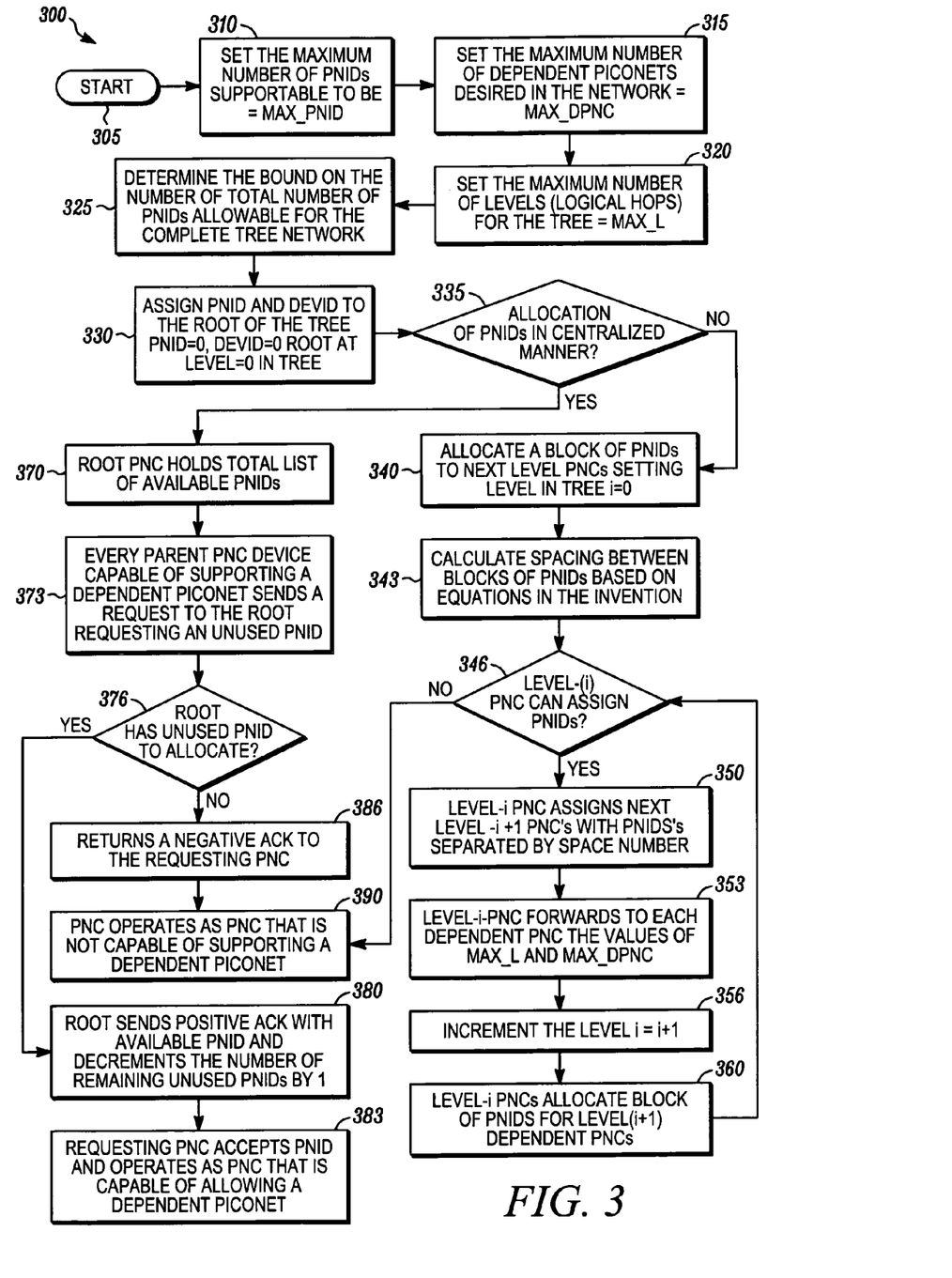
FIG. 3 is an exemplary flowchart outlining the operation of a root piconet coordinator or a parent piconet coordinator according to another related embodiment.

FIG. 3 is an exemplary flowchart 300 outlining the operation of the Root PNC 110 or a parent PNC according to another related embodiment. The flowchart 300 can be used for tree setup and initialization. The flowchart 300 can also be used for assigning PNIDs. In step 305, the flowchart begins. In step 310, the PNC sets a maximum number of PNIDs (Max_PNID) to be equal to the maximum number of PNIDs supportable, the Max_PNID number can be $2^{bits}$ needed to represent a PNID. In step 315, the PNC sets a value Max_DPNC to be the maximum number of dependent piconets desired in the network. In step 320, the PNC can set a value Max_L to be the maximum number of levels or logical hops for the tree 100. This value can be dependent upon the number of CTAs that can be supported or re-used throughout the system 100 based on available resources, a desired structure, or the like. In step 325, the PNC can determine a bound on the number of total number of PNIDs allowable for the complete tree network. This number can be the total number of PNCs that a tree of Max_L hops can support as described above. In step 330, the PNC, such as the Root PNC 110, can assign a PNID and a DevID to the Root PNC 110 or a PNC of the tree 100. For example, the Root PNC 110 can have a PNID=0 and a DevID=0, where the Root PNC 110 is at Level-0 of the tree 100. In step 335, the PNC determines if the PNIDs are not to be allocated in a centralized manner. If so, in step 340, the PNC can set a tree level value i=0 and can allocate a block of PNIDs to next level PNCs. In step 343, the PNC can calculate the spacing between blocks of PNIDs based on the equations above. In step 346, the PNC can determine if a Level-i PNC can assign PNIDs. If so, the PNC can assign the next level i+1 PNCs with PNIDs separated by a space determined from the equations above. For example, a first PNC can receive a PNID=1, a second PNC can receive a PNID=1+space, a third PNC can receive a PNID=1+space+space, etc. In step 353, a Level-i PNC can forward the values Max_L and Max_DPNC to each dependent PNC. In step 356, the PNC can increment the level value i=i+1. In step 360, the Level-i PNCs can allocate a block of PNIDs for Level-i+1 dependent PNCs. The flowchart 300 can then return to step 346. If in step 346 the PNC determines a Level-i PNC cannot assign PNIDs, in step 390, the Level-i PNC operates as a PNC that is not capable of supporting dependent piconets.

If in step 335 the PNC determines the PNIDs are to be allocated in a centralized manner, in step 370, the Root PNC 110 can hold a total list of available PNIDs. In step 373, one or more parent PNCs capable of supporting a dependent piconet can send a request to the Root PNC 10 requesting an unused PNID. In step 376, the Root PNC 110 can determine if it has an unused PNID to allocate. If so, in step 380, the Root PNC 110 can send a positive acknowledgement (positive ACK) to a requesting PNC, the positive ACK can include the available PNID. The Root PNC 110 can also reduce the number of available PNIDs by 1. In step 383, the requesting PNC can accept the PNID and operate as a parent PNC that is capable of allowing a dependent piconet. For example, the parent PNC can allow one of its child devices to become a dependent PNC and can assign it the available PNID. The parent PNC can then request another PNID if it can support another dependent piconet. If in step 376, the Root PNC 110 does not have an unused PNID to allocate, in step 386, the Root PNC 110 returns a negative ACK to the requesting PNC and in step 390 the requesting PNC operates as a PNC that is not capable of supporting a dependent piconet.

Figure 4:
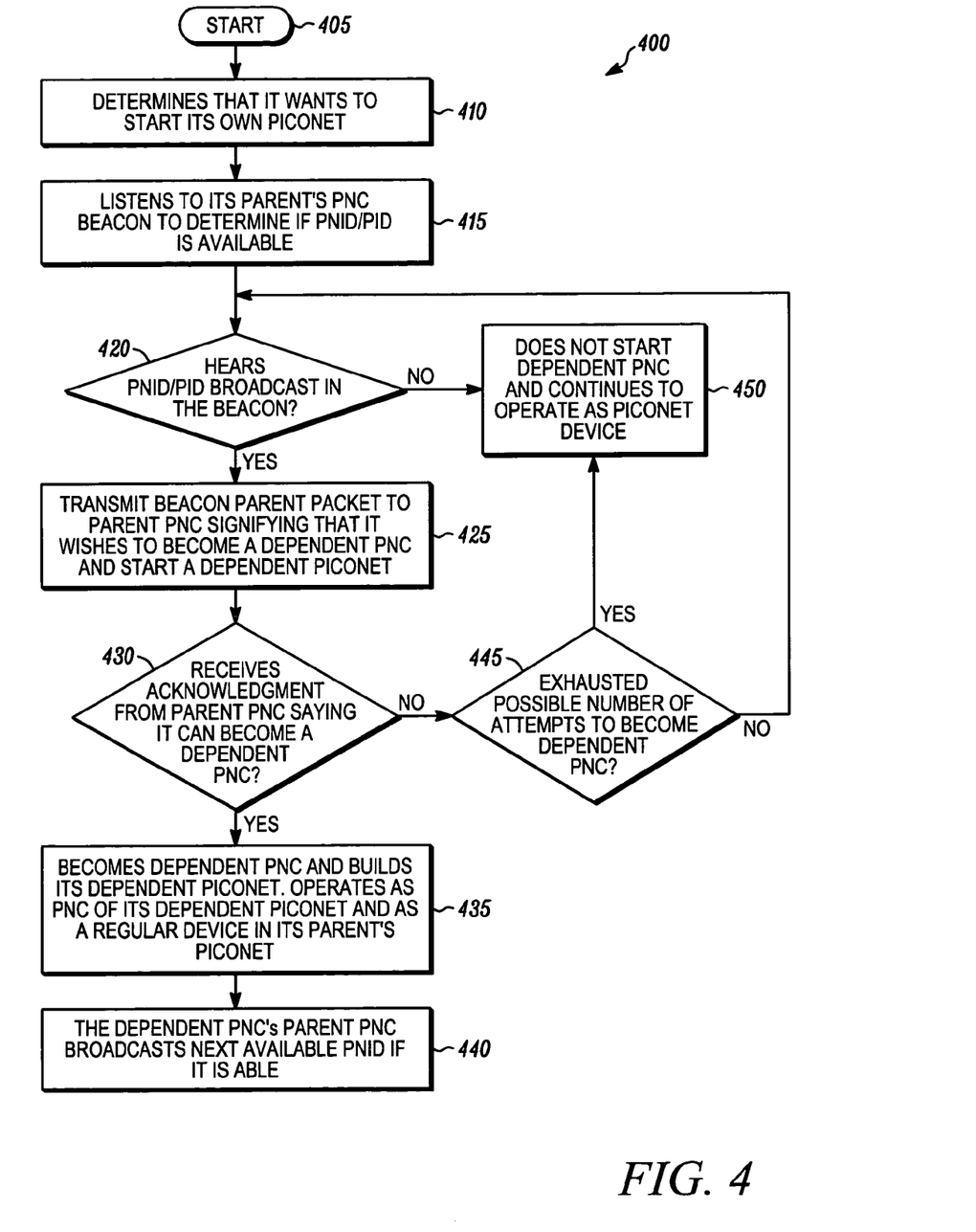
FIG. 4 is an exemplary flowchart outlining the operation of a prospective parent piconet coordinator device according to another related embodiment.

FIG. 4 is an exemplary flowchart 400 outlining the operation of a prospective parent PNC device according to another related embodiment. For example, the flowchart 400 can illustrate a process a device undergoes to become a dependent PNC and start its own dependent piconet. In step 405, the flowchart 400 begins. In step 410, a device determines that it wants to start its own piconet. For example, the device can determine that it has enough channel allocation to support a dependent piconet. In step 415, the device can listen to its parent PNCs beacon to determine if a PNID/PID is available. In step 420, the device can determine if it hears a PNID/PID broadcast in the beacon. If not, in step 450, the device does not start its own dependent PNC and continues to operate as a regular piconet device. If so, in step 425, the device transmits a beacon parent packet to its parent PNC signaling that it wishes to become a dependent PNC and start its own piconet. In step 430, the device determines if it received acknowledgement from its parent PNC saying it can become a dependent PNC. If so, in step 435, the device becomes a dependent PNC, builds its dependent piconet, operates as a PNC of its dependent piconet, and operates as a regular device in its parent PNC's piconet. In step 440, the device's parent PNC can then broadcast a next PNID if it is available. If in step 430, the device determines it does not have authorization from its parent PNC to become a dependent PNC based on the requested PNID/PID, in step 445, the device determines if it has exhausted a total possible number of attempts to become a dependent PNC. If not, the device returns to step 420. If so, in step 450, the device does not start its own dependent PNC and continues to operate as a regular piconet device.

For intra-piconet communication routing according to one embodiment, in cases where the sending and receiving devices are capable of direct communications or within "ear shot" of one another and members of the same piconet, the sending devices can transmit a communication data packet during its GTS and the receiving device that is listening during this time can receive it. The process is essentially point-to-point communication.

In the event that the devices are members of the same piconet, but not within "ear shot" of one another, the sending device can send the message to its parent PNC. The sending device can place the logical address of the destination device into the communication data packet's payload. The PNC can decode this address information and can be responsible for sending the packet to the destination device. The packet can then travel two logical hops for multi-hop communication.

For inter-piconet communication routing according to one embodiment, in a situation where a sending device in one piconet wishes to send a data packet to a destination node in another piconet, the sending device can recognize that the destination device is not a member of its piconet(s), and thus can forward the packet to its parent PNC. The sending device can place the destination device's logical address and possibly an IEEE address into a payload portion of the communication data packet. The PNC can decipher the address from the payload, look at the destination address information, and compare it to addresses of the devices in its neighbor table. If the destination device is not located in the parent PNC's neighborhood table, then the parent PNC can have two options. If devices above it in the tree structure use the PID address of the destination device, the PNC can forward the packet to its parent PNC, which can perform the same table look-up procedure. If the PID belongs to an accessible device below it in the logical tree structure, according to the PNID/PID assignment methodology, the PNC device can deliver the packet to its appropriate dependent PNC. Thus, the packet can be routed up or down the tree based on the assigned PID/PNID. Therefore, using this routing by ID method can avoid looping and there is a built-in level of intelligence based on the PNID assignment.

The routing of the communication data packet stops when the destination address of the data packet matches the address of the receiving device. In the case that the destination device is not found and the data packet is forwarded all the way up the tree to the Root PNC 110, the Root PNC 110 can relay the packet to all its children that are dependent PNC's except for the child that it received the data packet from in the first place. These children can relay the packet down the tree in a fashion similar to going up the tree until it reaches its final destination or the packet is discarded because it has reached the last dependent piconet of a branch.

Figure 5:
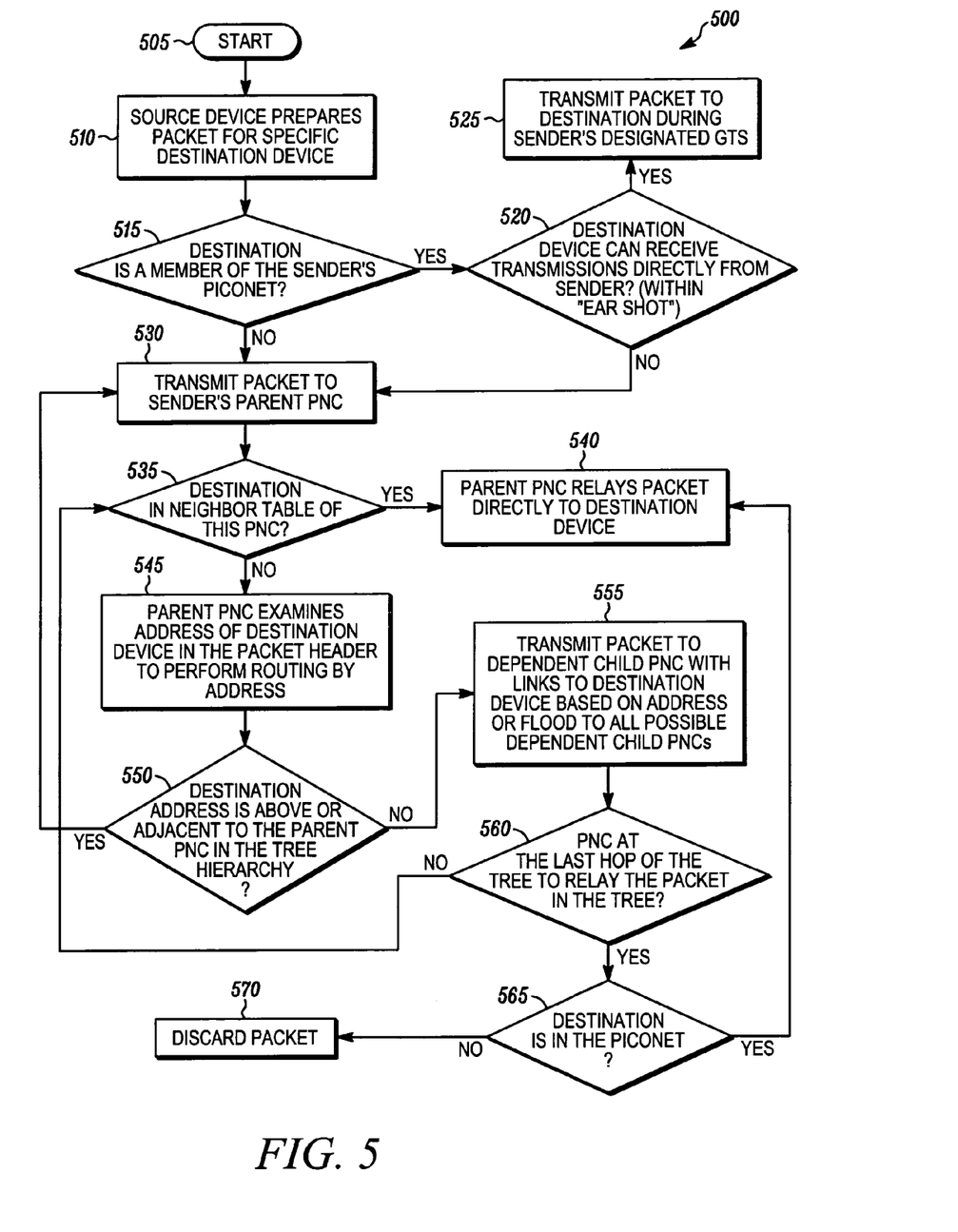
FIG. 5 is an exemplary flowchart outlining the operation of communication routing in the system according to another related embodiment.

FIG. 5 is an exemplary flowchart 500 outlining the operation of communication routing in the system 100 according to another related embodiment. In step 505, the flowchart begins. In step 510, a communication source device can prepare a communication packet for a desired destination device. In step 515, the source device determines if the destination device is a member of the source device's piconet. If so, in step 520, the source device determines if the destination device can receive the communication directly from the source device. For example, the source device determines if the destination device is within "ear shot". If so, in step 525, the source device transmits the packet directly to the destination device during the source device's designated GTS. For example, the destination device is typically in a receive mode for reception of such communications. If the result is negative in step 515 or in step 520, in step 530, the source device transmits the communication packet to the source device's PNC. In step 535, the PNC determines if the destination is in a neighbor table of the PNC. If so, in step 540, the PNC relays the communication packet directly to the destination device. If not, in step 545, the PNC examines the address of the destination device in the packet header to perform routing by address. In step 550, the PNC determines if the destination address is above or adjacent to the PNC in the tree 100 hierarchy. If so, the PNC performs operations beginning at step 530 by transmitting the packet to the PNC's parent PNC. If not, in step 555, the PNC transmits the communication packet to a dependent child PNC with links to the destination device based on its address or the PNC floods the communication packet to all possible dependent child PNCs. In step 560, the child PNC determines if it is at the last hop of the tree 100 to relay the packet in the tree 100. If not, the PNC returns to step 535. If so, in step 565 the child PNC determines if the destination device is in its piconet. If so, the PNC advances to step 540 and relays the packet directly. If not, in step 570, the PNC discards the packet.

The method of this invention is preferably implemented on a programmed processor. However, the method and the controller, such as controller 114, may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the invention by simply employing the elements of the independent claims. Accordingly, the preferred embodiments of the invention as set forth herein are intended to be illustrative, not limiting. Various changes may be made without departing from the spirit and scope of the invention.

What is claimed is:

1. A method in a communication device of communicating between other devices in a piconet network, the method comprising:
   connecting to the piconet network; and
   transmitting at least one available piconet identifier prior to receiving a request for the available piconet identifier, the available piconet identifier providing parent piconet coordinator identification;
   wherein the method further comprises transmitting information for the calculation of a block of available piconet identifiers, the size of the block of available piconet identifiers being based on a maximum number of desired piconet coordinators, and
   wherein the size of the block of available piconet identifiers is based on a maximum number of desired piconet coordinators and a maximum number of levels of piconet coordinators.

2. The method according to claim 1, wherein the available piconet identifier is transmitted in a beacon of a superframe.

3. The method according to claim 1, further comprising receiving a request to become a dependent piconet coordinator capable of establishing a dependent piconet, the request including the available piconet identifier.

4. The method according to claim 1, wherein the piconet network comprises a collection of a plurality of logically associated devices that share a single identifier with a common coordinator.

5. The method according to claim 1, further comprising scheduling inter-piconet communications using logical spanning tree structure allocated address to specify parent-child relationships that dictate when to route information from one piconet to another piconet and using assignment of bandwidth to schedule intra-piconet communication among non-piconet controller devices and respective piconet controllers.

6. The method according to claim 1, wherein an interconnection of a single independent root piconet and a plurality of dependent piconets create a logical multi-hop spanning tree routing backbone.

7. The method according to claim 1, further comprising creating a dependent piconet controller from a pre-exiting non-piconet controller device in the piconet network using information from a parent piconet controller,
   wherein pre-existing non-piconet controller devices act in a first come first served fashion to request to become a dependent piconet controller based on availability of support by a related parent piconet controller device, and
   wherein pre-existing non-piconet controller device requests to become a piconet controller using a priority scheme based on its piconet node address.

8. The method according to claim 1, further comprising routing inter-piconet communications over routes contingent upon piconet controller addresses.

9. A communication device for communicating between other devices in a piconet network, the apparatus comprising:
   a transceiver configured to connect to the piconet network; and
   a controller coupled to the transceiver, the controller configured to transmit, via the transceiver, at least one available piconet identifier prior to receiving a request for the available piconet identifier, the available piconet identifier providing a parent piconet coordinator identification for the communication devices,
   wherein the controller is further configured to transmit, via the transceiver, information for the calculation of a block of available piconet identifiers, the size of the block of available piconet identifiers being based on a maximum number of desired piconet coordinators, and
   wherein the size of the block of available piconet identifiers is based on a maximum number of desired piconet coordinators and a maximum number of levels of piconet coordinators.

10. The communication device according to claim 9, wherein the available piconet identifier is transmitted in a beacon of a superframe.

11. The communication device according to claim 9, wherein the controller is further configured to receive, via the transceiver, a request to become a dependent piconet coordinator capable of establishing a dependent piconet, the request including the available piconet identifier.

12. The communication device according to claim 9, wherein the piconet network comprises a collection of a plurality of logically associated devices that share a single identifier with a common coordinator.

13. A method in a communication device of communicating between other devices in a piconet network, the method comprising:
   connecting to the piconet network;
   determining if the communication device can support a dependent piconet; and
   receiving at least one available piconet identifier prior to transmitting information regarding requesting establishing a dependent piconet, the available piconet identifier providing parent piconet identification for the communication device for the dependent piconet,
   wherein the method further comprises calculating a block of available piconet identifiers, the size of the block of available piconet identifiers being based on a maximum number of desired piconet coordinators, and
   wherein the size of the block of available piconet identifiers is based on a maximum number of desired piconet coordinators and a maximum number of levels of piconet coordinators.

14. The method according to claim 13, wherein the information regarding requesting establishing a dependent piconet includes an indicator indicating a desire to become a dependent piconet coordinator capable of establishing a dependent piconet.

15. The method according to claim 13, wherein the available piconet identifier is received in a beacon of a superframe.

16. The method according to claim 13, further comprising transmitting a request to become a dependent piconet coordinator capable of establishing a dependent piconet, the request including the available piconet identifier.

17. The method according to claim 13, wherein the piconet network comprises a collection of a plurality of logically associated devices that share a single identifier with a common coordinator.

18. A communication device for communicating between other devices in a piconet network, the communication device comprising:
   a transceiver configured to connect to the piconet network; and
   a controller coupled to the transceiver, the controller configured to determine if the communication device can support a dependent piconet, the controller further configured to receive, via the transceiver, at least one available piconet identifier prior to requesting information regarding establishing a dependent piconet, the available piconet identifier providing parent piconet identification for the communication device for the dependent piconet, wherein the controller is further configured to calculate a block of available piconet identifiers, the size of the block of available piconet identifiers being based on a maximum number of desired piconet coordinators, and wherein the size of the block of available piconet identifiers is based on a maximum number of desired piconet coordinators and a maximum number of levels of piconet coordinators.

19. The communication device according to claim 18, wherein the information regarding establishing a dependent piconet includes an indicator indicating a desire to become a dependent piconet coordinator capable of establishing a dependent piconet.

20. The communication device according to claim 18, wherein the available piconet identifier is received in a beacon of a superframe.

21. The communication device according to claim 18, wherein the controller is further configured to transmit, via the transceiver, a request to become a dependent piconet coordinator capable of establishing a dependent piconet, the request including the available piconet identifier.

22. The communication device according to claim 18, wherein the piconet network comprises a collection of a plurality of logically associated devices that share a single identifier wit a common coordinator.

* * * * *

UNITED STATES PATENT AND TRADEMARK OFFICE
CERTIFICATE OF CORRECTION

PATENT NO. : 7,002,938 B2 Page 1 of 1
APPLICATION NO. : 10/744032
DATED : February 21, 2006
INVENTOR(S) : Lance E. Hester, Yan Huang and Padmaja Ramadas It is certified that error appears in the above-identified patent and that said Letters Patent is hereby corrected as shown below:

Col. 1, Line 5
In the specification, after the title and before the heading "FIELD OF THE INVENTION" the following paragraph should be inserted:

STATEMENT REGARDING FEDERALLY
SPONSORED RESEARCH OR DEVELOPMENT

This invention was made with United States Government support under 70NANB2H3001 awarded by the National Institute of Standards and Technology (NIST). The United States Government has certain rights in the invention.

Signed and Sealed this

Thirteenth Day of January, 2009

JON W. DUDAS
*Director of the United States Patent and Trademark Office*